United States Patent [19]

deKok

[11] Patent Number: 4,641,628
[45] Date of Patent: Feb. 10, 1987

[54] REMOVABLE MOUNT FOR CUTTING MEANS

[76] Inventor: Peter T. deKok, P.O. Box 33569, Decatur, Ga. 30033

[21] Appl. No.: 734,791

[22] Filed: May 16, 1985

Related U.S. Application Data

[63] Continuation-in-part of Ser. No. 455,214, Jan. 3, 1983, Pat. No. 4,517,954.

[51] Int. Cl.⁴ ............................................. B28D 1/04
[52] U.S. Cl. ........................................ 125/15; 407/47; 83/831
[58] Field of Search ............... 125/15, 18, 22; 407/47, 407/48, 67, 33, 34, 46; 83/831

[56] References Cited

U.S. PATENT DOCUMENTS

| 1,125,102 | 1/1915 | Huther | 407/47 |
| 2,589,357 | 3/1952 | Fantozzi | 125/15 |
| 2,852,048 | 9/1958 | Cox | 83/831 |
| 4,517,954 | 5/1985 | deKok | 125/15 |

FOREIGN PATENT DOCUMENTS 2730912  1/1979  Fed. Rep. of Germany ........ 125/15

Primary Examiner—Harold D. Whitehead
Attorney, Agent, or Firm—James B. Middleton

[57] ABSTRACT

A cutting element, for use on the cutting member of a variety of cutting machines, particularly for stone cutting machines. The cutting element includes a base member substantially permanently fixable to the cutting member, and a cap member selectively engageable with the base member. The cap member has hooks that mechanically lock the cap member to the base member, so removal of the cap member during cutting is resisted mechanically. The cap member can be moved laterally of the base member for removal; and, a fastener such as a rivet selectively holds the cap member against such lateral motion.

5 Claims, 5 Drawing Figures

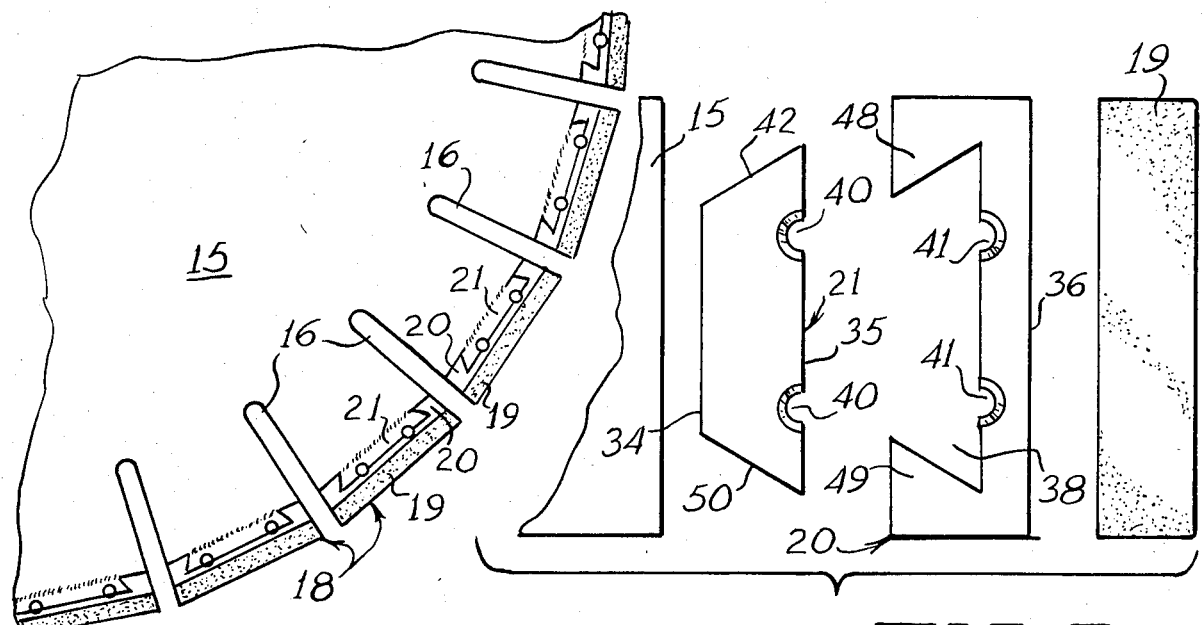
FIG. 1
FIG. 2
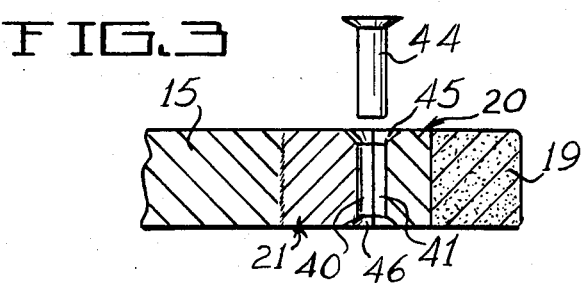
FIG. 3
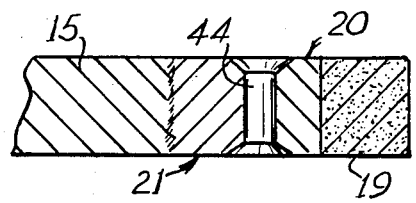
FIG. 4
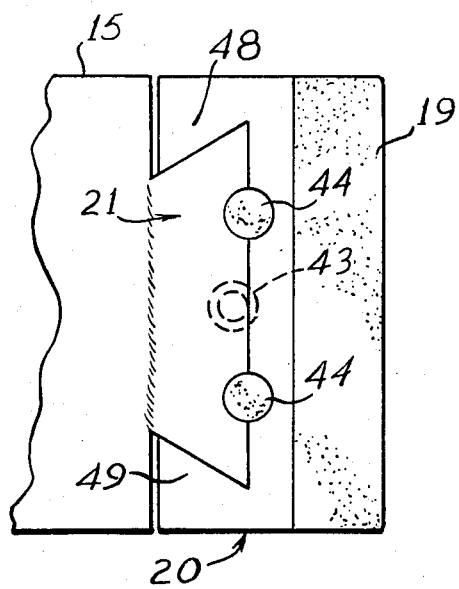
FIG. 5

REMOVABLE MOUNT FOR CUTTING MEANS

CROSS-REFERENCE TO RELATED APPLICATION

This application is a continuation-in-part of the co-pending application having the same title, filed Jan. 3, 1983, having Ser. No. 455,214, and to be issued as U.S. Pat. No. 4,517,954 on May 21, 1985.

INFORMATION DISCLOSURE STATEMENT

There are several forms of cutting tools wherein a plurality of teeth, or cutting elements, move along a surface to make a cut. These teeth or cutting elements, are mounted on different types of cutting machines including rotary saws, gang, or reciprocating saws, and chain saws. The rotary raws have large blades, ranging up to 3500 mm in diameter with a thickness in the vicinity of 9 mm. The reciprocating saws have blades up to 8000 mm long with a thickness around 10 mm. In all the above mentioned cutting machines, the stone cutting is accomplished by the teeth or cutting elements arranged along the cutting edge of the blade. The cutting elements are formed of metal-bonded diamond particles, so that the diamond particles do the actual cutting of the stone. Thus, as the diamond particles are worn away, the cutting elements must be replaced with new cutting elements.

The conventional technique for replacing the cutting elements is to remove the remains of the old cutting elements, and weld or otherwise bond new cutting elements to the blade. These techniques require heat, which may warp or unbalance the saw blade requiring extensive reworking of the blade. Additionally, the entire cutting blade must frequently be shipped long distances because the diamond industry and the stone cutting industry are vastly removed from each other geographically.

Because of the above discussed difficulties, there have been some efforts at providing easily removable and replaceable cutting elements for stone cutting saws and the like. These efforts have been largely unsuccessful both because of the difficulty in providing a suitable mechanical structure, and because of the limitation in the cutting tools caused by the particular form of removable cutting elements. The prior art removable cutting elements have normally required a rather complex mechanical arrangement, and have usually required considerable thickness in the saw to achieve the necessary strength in the mounting structure. Furthermore, the prior art removable cutting elements have been adapted for use on only one type of cutting machine, and cannot be used on other types.

SUMMARY OF THE INVENTION

This invention relates generally to cutting teeth and the like, and is more specifically concerned with a mounting means to render cutting means removable from and replaceable on the cutting members, particularly for stone cutting tools.

The present invention overcomes the above mentioned and other difficulties with the prior art by providing an extremely simple mounting means including a base member attachable to the cutting member of the saw or other cutting machine. The base member can be permanently secured, as by welding or the like, and can be made the same thickness as the conventional cutting blade, or as wide as may be desired for other forms of cutting members. The base member cooperates with a removable cap member, the cap member having a cutting means fixed thereto, for example a diamond segment. The cap member is installed on the base member by a motion angularly related to the direction of cutting motion of the cutting member so that, after the cap member with its cutting means is fixed to the base member, normal cutting motion will be resisted by mechanically interlocked pieces rather than by temporary securing means. The cap member can be removably fixed to the base member by generally conventional means, the securing means being well within the kerf, or otherwise located not to interfere with normal cutting operations. Additionally, the parts are simple shapes that are easy to machine to close tolerances using conventional machine tools.

BRIEF DESCRIPTION OF THE DRAWINGS

These and other features and advantages of the present invention will become apparent from consideration of the following specification when taken in conjunction with the accompanying drawings in which:

FIG. 1 is a partial side elevational view of a circular saw having removable cutting segments that are made in accordance with the present invention;

FIG. 2 is an exploded, side elevational view of the removable mount for a cutting segment shown in FIG. 1;

FIG. 3 is an enlarged cross-sectional view taken substantially along the line 4—4 in FIG. 1, but showing the securing means before installation;

FIG. 4 is an enlarged cross-sectional view taken substantially along the line 4—4 in FIG. 1; and, FIG. 5 is an enlarged side elevational view showing one of the cutting means of FIG. 1.

DETAILED DESCRIPTION OF THE EMBODIMENT

Referring now more particularly to the drawings, and to that embodiment of the invention here presented by way of illustration, FIG. 1 shows a circular saw blade 15 having notches 16 between cutting members generally designated at 18. These cutting members 18 include the cutting segments 19 fixed to the cap members 20, the cap members 20 being removably fixed to the base members 21. The base members 21 are welded or otherwise permanently fixed to the periphery of the circular saw blade 15. It will therefore be understood that, when the cutting segment 19 is worn out, the cap member 20 with the attached segment 19 can be removed, and a new cap member 20 with a new cutting segment 19 can be installed. This can usually be accomplished without dismounting the circular saw blade 15.

While only the circular saw blade is here specifically illustrated, the above identified co-pending application illustrates a reciprocating saw, a chain saw and a milling cutter in addition to the circular saw. That disclosure is incorporated herein by reference. It will thus be understood that the present invention provides a virtually universal cutting element, the cutting element being very readily adaptable to cutting machines regardless of the type of machine. In all cases, it will be realized that the cutting element of the present invention will be mounted and dismounted with motion in a direction angularly related to the cutting direction of the cutting element.

Attention is now directed to FIGS. 2–5 of the drawings for a detailed description of the construction of a device made in accordance with the present invention. It will be seen in FIGS. 3 and 4 that the base member 21 has a width generally equal to the width of the cap member 20. The base member 21 is formed as a dovetail, and is arranged so that the cap member 20 can be mounted thereon by lateral motion. The base member 21 has a rear, or inner, surface 34 that would be fixed to the saw blade 15, and an outer surface 35, the outer surface 35 being longer than the inner surface 34 so the upper and lower surfaces diverge to form the dovetail shape. Also, the cap member 20 includes an outer surface 36 to which the cutting segment 19 would be fixed, and a base receiving opening 38. The base receiving opening 38 is substantially the same size and shape as the base member 21 so that the base member 21 will fit within the opening 38 and the cap member 20 will be mechanically locked against all motions other than the lateral motion used for installation.

It should be understood that, with the above described arrangement, the cutting segment 19 would be moved up or down as viewed in the drawings, and both of these motions would be resisted by the dovetail interlock between the base 21 and the cap 20. To hold the cap 20 on the base 21 against lateral forces, there is a fastener, here shown as a pin, or rivet, 40 received within a hole 41 defined between the cap member 20 and the base member 21.

In the above identified co-pending application, the means for securing the cap 20 against lateral motion takes the form of a pin extending generally parallel to the end surface of the dovetail of the base member 21. While such an arrangement is quite successful in many cutting tools, there are some tools wherein there is not enough space at the side of the cutting element to install or remove such a pin. For example, small circular saws, generally as shown in FIG. 1 of the drawings, may have notches 16 between cutting elements around 2 mm wide. It would therefore be impractical to attempt to insert a pin as shown in the drawings of the previous application.

The broad principle disclosed in the previous application is to provide a mechanical interlock between the base member 21 and the cap 20 carrying the cutting segment 19, and to provide relatively easily removable securing means to prevent lateral motion. That broad principle is confirmed in the present application, and the removable securing means is altered to allow use in a wider variety of apparatus.

While the roll pin disclosed in the previous application is sufficient so long as the pin can be inserted, it will be understood that, as discussed in conjunction with FIG. 4 of the previous application, there are conditions under which the pin cannot be inserted. Under these conditions, the pin, or securing means, is preferably inserted laterally. In the previous application, the securing means includes a hole defined between the base member and the cap, and threaded for receiving a screw, such as a set screw.

In the present application, the securing means is inserted laterally, and the hole for receiving the securing means is defined generally between the base member and the cap. One improvement over the previous application is that the hole need not be threaded, and another improvement is that the hole may be substantially in one member rather than extending into both.

Referring again to FIGS. 2–5 of the drawings in the present application, it will be seen that there are complementary semi-circular openings 40 and 41 in the base member 21 and cap member 20 respectively. When the cap member 20 is properly in place on the base member 21, the openings 40 and 41 define a single hole for receiving a securing means, such as the rivet 44.

As is well known in the art, a rivet is swaged to be retained in a hole. In the present invention, it is important to have no projections beyond the side of the blade 15, or specifically beyond the width of the cutting segment 19. Thus, the hole defined by the openings 40 and 41 is countersunk as at 45 and 46 so the rivet can be swaged to be coplanar with the sides of the blade 15. The final installation is shown in FIG. 4.

FIG. 5 illustrates the cutting segment 19 secured to a cap member 20, and the cap member 20 mounted on a base member 21 which is fixed to a cutting tool such as the blade 15. As is shown, two of the securing means such as the rivets 44 may be used. While the securing means are here shown as between the outer surface 35 of the base member, and the cap member 20, it will be obvious that the securing means can equally well be placed between the end surfaces as disclosed in the previous application.

Still looking at FIG. 5, it will be seen that there is a broken line representation of another hole, designated as 43. In the event the cap member 20 (for example) is too thin to allow a reduction in thickness, the hole 43 can be placed entirely in the base member 21. As shown, the countersinks may extend into the cap member 20 so that, when the rivet is swaged, the rivet will engage the cap member 21 and prevent lateral motion.

Due to the above described construction, it will be understood that the tolerances between the base member 21 and the opening 38 in the cap member 20 can be quite close. It will be easily understood that the cap member 20 cannot move with respect to the base member 21 longitudinally because the cap member 20 is provided with, effectively, hook members 48 and 49 that hook over the ends 42 and 50 of the base member 21. The cap member 20 will not move laterally with respect to the base member 21 because of the above described rivet 44. The swaged rivet will be sufficient to hold the cap 20 against any normal forces that may be applied to the cap member 20. If the cap member 20 has rotational forces applied thereto, the axis of rotation being at one side of the base member 21, it will be seen that the hook members 48 and 49 will again tend to hold onto the surfaces 42 and 50 of the base member 21. If the rotational force is applied with the axis radially of the saw blade 15, it is only the width of the base 21 and cap member 20 and the closeness of tolerances that will prevent such motion. Those skilled in the art will understand that, with the relatively hard metals involved, and reasonably close tolerances, the width of the base member 20 and cap member 21 can be as small as about 2 mm, and there will still be sufficient mechanical resistance to such a rotational force. Of course, the holding action of the rivets will further tend to prevent such motion.

The upper and lower surfaces 42 and 50 of the base member are here shown as diverging to form the dovetail as described. Those skilled in the art will realize that the object to be accomplished to is provide the mechanical lock as described, and other arrangements may be used.

From the foregoing description, it should now be understood that the present invention provides an extremely simple but highly effective means for providing removable cutting segments on any of a great variety of cutting tools. The device shown in FIGS. 2 through 5 is easily adaptable to virtually any form of saw, and can be made extremely narrow, perhaps down to a width of approximately 2 mm or so. Even at this narrow width, it will be seen that the cap member 20 is mechanically locked to the base member 21, and the cutting segment can be moved in either direction without adversely affecting the mount. Also, the cap member 20 will always be precisely placed with respect to the base member 21 so that, once a saw is set up, substitution of new cap members 20 with new cutting segments 19 thereon will not change the configuration of the saw. The device can obviously be made in any greater width desired, so the base member 21 can have a width precisely equal to the thickness of the saw.

For other cutting devices, such as milling cutters, the proportion of the mounting device can be changed without changing the basic structure of function. Thus, the device can be made wider but shorter, and the device can still be operated in either direction, and both directions are still substantially perpendicular to the motion required for removing the cap member 20 from the base member 21.

While a rivet has been herein disclosed for securing the cap member to the base member in a removable fashion, those skilled in the art will readily devise additional temporary securing means. From the examples given herein, it will be understood that various forms of pins, set screws and the like can be used, the object being to place the securing means in a relatively convenient location without allowing the securing means to interfere with the cutting action. Also, it will be realized that the device of the present invention can be dimensioned and proportioned as may be needed to adapt the device to other forms of cutting machines, and any number of securing devices can be used on each device, all without changing the inventive concept.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

I claim:

1. In combination, a cutting machine having a movable periphery movable in at least one direction, and a plurality of cutting elements fixed to said movable periphery, said plurality of cutting elements constituting a cutting edge for said cutting machine, the width of said cutting elements determining the width of the kerf cut by said cutting machine, said cutting edge being movable with said movable periphery, each cutting element of said plurality of cutting elements including a base member fixed to said movable periphery, a cap member selectively receivable on said base member and having a width equal to the width of said base member, and a cutting segment fixed to said cap member and having a width equal to the width of said cap member, said base member having flat sides and diverging end surfaces, said diverging end surfaces diverging in the direction of motion of said cutting edge so that said base member has a dovetail configuration, said cap member including hook members at each end thereof selectively engageable with said diverging end surfaces of said base member, said hook members including converging surfaces so that said cap member defines a dovetail opening therein for receiving said base member, the arrangement being such that said dovetail opening in said cap member can receive said dovetail configuration of said base member only with lateral motion of said cap member with respect to said direction of motion of said cutting edge, and securing means receivable between said cap member and said base member for engagng both said cap member and said base member for selectively preventing said lateral motion and retaining said cap member on said base member.

2. The combination claimed in claim 1, said base member including an outer surface extending between said diverging surfaces, said base member defining at least one opening therein adjacent to one of said surfaces, and a fastener received within said opening and engaging both said base member and said cap member, said fastener constituting said securing means.

3. The combination as claimed in claim 2, said at least one opening consisting of a first opening in said base member and a first complementary opening defined in said cap member, the arrangement being such that said first opening and said first complementary opening jointly receive said fastener.

4. The combination as claimed in claim 3, wherein said fastener comprises a rivet.

5. The combination as claimed in claim 4, said base member and said cap member defining a countersink surrounding said at least one opening, said rivet being swaged into said countersink.

* * * * *